Sept. 13, 1938.  J. SINKO  2,129,792
CIGAR LIGHTER
Filed Oct. 7, 1937
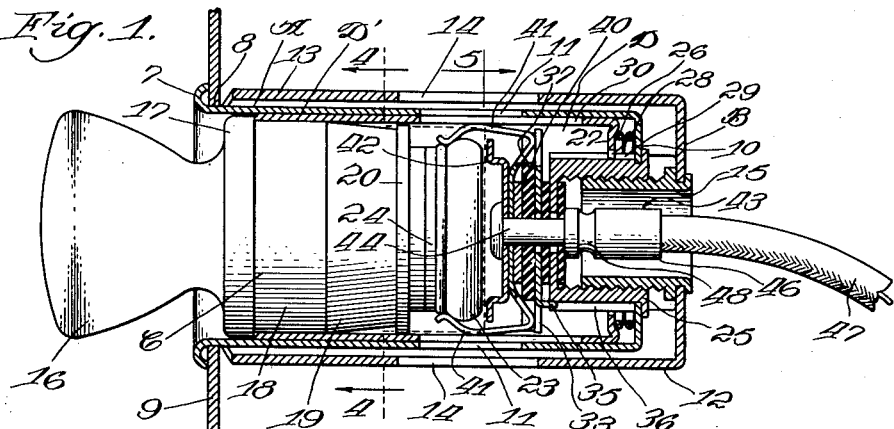
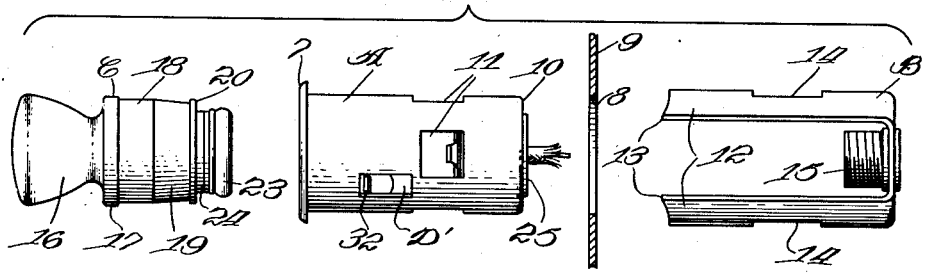
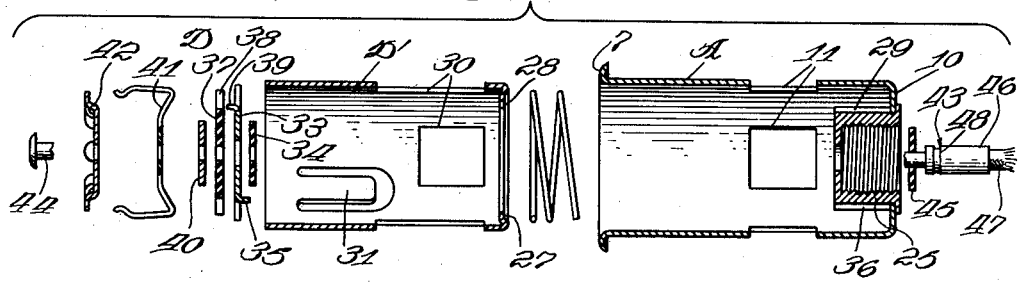
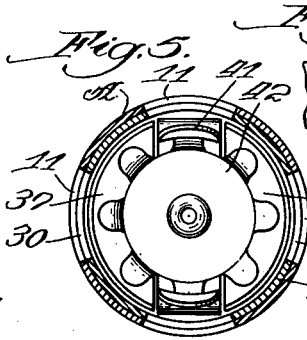
Inventor:
John Sinko.

Patented Sept. 13, 1938

2,129,792

UNITED STATES PATENT OFFICE 2,129,792

CIGAR LIGHTER

John Sinko, Chicago, Ill.

Application October 7, 1937, Serial No. 167,833

11 Claims. (Cl. 219—32)

This invention relates to electric cigar lighters adapted for use in automobiles and other vehicles and more particularly to cigar lighters known as the wireless type.

The primary object of the present invention is to provide an improved construction which is easy to install on the instrument panel of a machine and can be easily operated due to an improved contacting device.

A further object of the invention is to provide a cigar lighter having a thermostat which, after being engaged with the removable igniting plug, will hold the circuit closed until the lighter reaches the desired temperature.

Another object of the invention is to provide an improved clamping device, for securing the lighter to the instrument board of a car, which will not increase the required overall length and will protect the lead-in wire which is connected with a base-terminal in the cigar lighter socket. It will be understood that usually in lighters of this type the socket is grounded to a panel which is electrically connected to one side of a current supply source.

The present invention is an improvement over the lighter shown in my application Serial No. 724,849, filed May 10, 1934.

The invention is illustrated in a preferred embodiment in the accompanying drawing, in which:

Figure 1 is a longitudinal sectional view of the assembled socket casing with the removable igniting plug in energized position; Fig. 2, an exploded view of the plug member, socket member, and clamping device; Fig. 3, an exploded sectional view of the various parts contained in the socket member; Fig. 4, a transverse sectional view, taken as indicated at line 4—4 of Fig. 1; Fig. 5, a sectional view, taken as indicated at line 5 of Fig. 1; and Fig. 6, a fragmentary sectional view showing one of the spring detents which engages a removable plug member.

In the embodiment illustrated, A designates a tubular casing; B, a clamping device for securing the casing to the instrument board of a vehicle; C, a removable igniting plug adapted to fit into the casing and be energized by contact with electrical supply terminals therein; and D, a contacting unit mounted in the casing and provided with a terminal-sleeve D'.

The casing A preferably is made of tubular metal and is provided with an outwardly extending ornamental flange 7 which is adapted to engage the marginal edge portions of an aperture 8 provided in a panel 9. The front end of the casing is provided with an apertured end wall 10 and is shown provided with ventilating apertures 11.

The casing is secured to the panel by means of the clamping device B which comprises a U-shaped device having integrally formed rearwardly extending arms 12 which are provided at their extreme rear end with sharpened edge portions 13 adapted to cut into the metal panel and insure a good electrical connection. If desired, the arms 12 may be provided with ventilating openings 14. A rearwardly extending hollow, exteriorly threaded, stud 15 is fixed to the device so that it may be threaded into a hollow post provided in the casing and draw the flange 7 tightly against the front of the panel. It will be understood that the arms are turned with the stud 15 so that the points 13 will scratch through any oil, lacquer, or the like, on the back of the panel and assure a good clean tight electrical connection.

The removable plug C is shown with a handle 16 provided at its base with a flange 17 which is of slightly less diameter than the inside of the casing B. The insulating body 18 of the plug is of somewhat smaller diameter and its front end portion 19 is tapered to a still further reduced diameter so as not to shield a metallic terminal flange 20 which is permanently connected electrically to a center pin 21 which in turn supports one end of a resistance coil 22. The coil is mounted in, and connected to, a metallic cup-like member 23 which is secured to, but insulated from, the flange 20 by means of an insulating washer 24. Thus it will be understood that when an electrical circuit is established through the terminals 20 and 23, the resistance coil 22 will rapidly be heated to the point of incandescence.

The contact unit D is mounted within the casing by means of a hollow, internally threaded, post-like member 25 which is fixed to the end-wall 10 of the casing. A compression spring 26 encircles the post and bears against an internally directed flange 27 which is slidably mounted on the post. The terminal-sleeve D' has a small detent 28 engaging a groove 29 in the post so that the windows 30 of the sleeve will remain in circumferential alignment with the windows 11 of the casing. The diameter of the terminal-sleeve D' is slightly smaller than that of the casing A so that it will slide freely therein. The sleeve is provided with inwardly bent spring detents 31 and 32 which restrain relative movement between the plug member C and the sleeve D'. The detent 31 bears against the flange 20 and insures good electrical connection therebetween, and the detent 32 has an inwardly extending elbow adapted to engage the reduced diameter of the plug and frictionally and mechanically oppose withdrawal of the plug from the sleeve. A slotted metallic abutment washer 33 is insulated from the post 25 by means of mica washers 34 and has a detent 35 adapted to engage groove 36 in the post. A thick slotted insulating washer 37 bears against the washer 33 and has a notch 38 engaged by a detent 39 of the washer 33 to prevent turning thereon. A metal washer 40 is disposed between a claw-like perforated bimetal thermostat 41, and the insulating washer 37 which is notched to receive the elbow portions of the thermostat. Also, the washer 33 has cut-outs to prevent the elbows of the thermostat from touching the washer or flange 27 of the sleeve. Between the arms of the thermostat is shown a metallic base-terminal 42 which serves as an abutment for the edges of the cup-like member 23 on the plug member. The assembly shown in Fig. 3 is held together by a connector 43 which has a shank portion 44 to extend through a mica washer 45 and through the perforations in the post, washers, thermostat, and base-terminal. Its outer end is preferably riveted against the contact member 42 so as to permanently secure the contacting device in assembled relation. The front end of the connecting piece has a hollow sleeve 46 of sufficient diameter to receive the end of the lead-in wire 47 and the body portion 48 has a smaller opening to receive the bare wire. The wire is secured in the connector by crimping.

It will be understood that the removable igniting plug C is normally held within the terminal sleeve D' by the spring detents 31 and 32. The rear end of the sleeve D' bears against the front end of the flange 17 and when it is desired to operate the device, it is merely necessary to force the handle 16 inwardly, so that the arms of the thermostat 41 will snap around the cup 23. In this position, as shown in Fig. 1, the resistance coil is energized through the lead wire 47, thermostat 41, and cup 23, on one side, and through the pin 21, flange 20, sleeve D', spring 26, casing A, and panel 9, on the other side. As the coil 22 reaches incandescence, the arms of the thermostat flex outwardly and finally permit the spring 26 to force the sleeve D' with the removable plug rearwardly in the socket. This release makes a slight noise or click which will indicate to the user that the device is ready for use.

The foregoing detailed description has been given for clearness of understanding only, and no unnecessary limitations should be understood therefrom, but the appended claims should be construed as broadly as permissible, in view of the prior art.

I claim:

1. In a cigar lighter: a tubular casing having an end wall; and an igniter plug-receiving contact unit in said casing comprising a rearwardly extending post fixed to said end wall and having a base-terminal contact insulated from the casing, a terminal-sleeve slidably mounted in the casing and having an end flange for limiting its rearward travel, said sleeve having yielding-means for restraining its movement with respect to an igniting plug and maintaining electrical connection therewith, and a spring in said casing for urging the sleeve rearwardly to prevent electrical connection between said base-terminal and a terminal on said plug.

2. A device as specified in claim 1, in which the base-terminal contact is provided with claw-like thermostatic-means for engaging a terminal on the igniter plug and maintaining electrical connection therewith against the influence of the spring until a resistance coil on the igniter plug reaches a desired temperature.

3. A device as specified in claim 1, in which the casing and terminal-sleeve are provided with ventilating apertures and said sleeve makes a tongue-and-groove sliding connection with the post so as to maintain said ventilating apertures in circumferential alignment.

4. In a cigar lighter: a tubular casing having at its open end an outwardly extending flange adapted to engage the marginal edge portions of a panel at an aperture through which the casing is projected, and having at its other end an apertured end-wall; a hollow, internally threaded, terminal-post in said casing fixed to said apertured end-wall; and a clamping-member extending rearwardly about the casing into contact with the panel, said member having a fixed rearwardly extending stud adapted to make threaded connection with said post.

5. A device as specified in claim 4, in which the clamping-member is U-shaped and spaced from the casing wall to provide ventilating space.

6. A device as specified in claim 4, in which the clamping-member has a pair of integrally formed rearwardly extending arms whose rear end portion is sharpened to cut into the rear of the panel and insure good electrical connection therewith.

7. In a cigar lighter terminal casing adapted to receive an igniting plug, a contact unit comprising: a hollow post fixed to the inner end-wall of the casing; a rearwardly extending terminal-sleeve provided with an inwardly extending end-flange slidably mounted on said post, said sleeve having a spring contact adapted to engage a terminal of the igniting plug; an abutment washer fixedly mounted on said post and insulated therefrom, said washer serving to limit the rearward travel of said terminal-sleeve; a spring in said casing urging the sleeve rearwardly; and a base-terminal fixed to the rear end of said post and insulated from said post and washer.

8. A device as specified in claim 7, in which the base-terminal is provided with a claw-like thermostat adapted to engage yieldingly and make electrical connection with a terminal on the plug member.

9. A device as specified in claim 7, in which the base-terminal is provided with a claw-like thermostat adapted to engage yieldingly and make electrical connection with a terminal on the plug member, a thick insulating washer is provided in rear of the thermostat and is slotted to receive elbows of said thermostat, and the abutment washer is slotted to provide clearance for said elbows, has a forwardly extending detent engaging the post and a rearwardly extending detent engaging the insulating washer to hold the parts in circumferential alignment.

10. In a cigar lighter: a tubular casing; a terminal-sleeve mounted for limited sliding movement in said casing, said sleeve having an inwardly extending spring detent for contacting a terminal of an associated plug member; a spring urging said sleeve rearwardly; a base-terminal fixed in the front of said casing and insulated from the sleeve; and a plug member provided at its front end with a cup-like member forming one terminal for an igniting unit and adapted to engage said base-terminal and provided further with a flange-like second terminal for said igniting unit adapted to be engaged by said spring detent when inserted into said sleeve, said plug member having an outer flange adapted to slide into the casing and abut against the rear end of the terminal-sleeve.

11. A device as specified in claim 10, in which the base-terminal is provided with a thermostat adapted to engage the cup-like terminal and thereby hold the plug member and sleeve forward, with an electrical circuit established through said igniting unit, until the igniting unit reaches a desired temperature.

JOHN SINKO.